Feb. 19, 1957 B. L. HAVENS ET AL 2,782,305

DIGITAL INFORMATION REGISTER

Filed Nov. 23, 1951 2 Sheets-Sheet 1

FIG. I

INVENTORS
BYRON L. HAVENS
CHARLES R. BORDERS
BY Albert R. Hodges
ATTORNEY

INVENTORS
BYRON L. HAVENS
CHARLES R. BORDERS
BY Albert R. Hodges
ATTORNEY

United States Patent Office 2,782,305
Patented Feb. 19, 1957

2,782,305

DIGITAL INFORMATION REGISTER

Byron L. Havens, Closter, and Charles R. Borders, Alpine, N. J., assignors to International Business Machines Corporation, New York, N. Y., a corporation of New York Application November 23, 1951, Serial No. 257,747

22 Claims. (Cl. 250—27)

Figure 1:
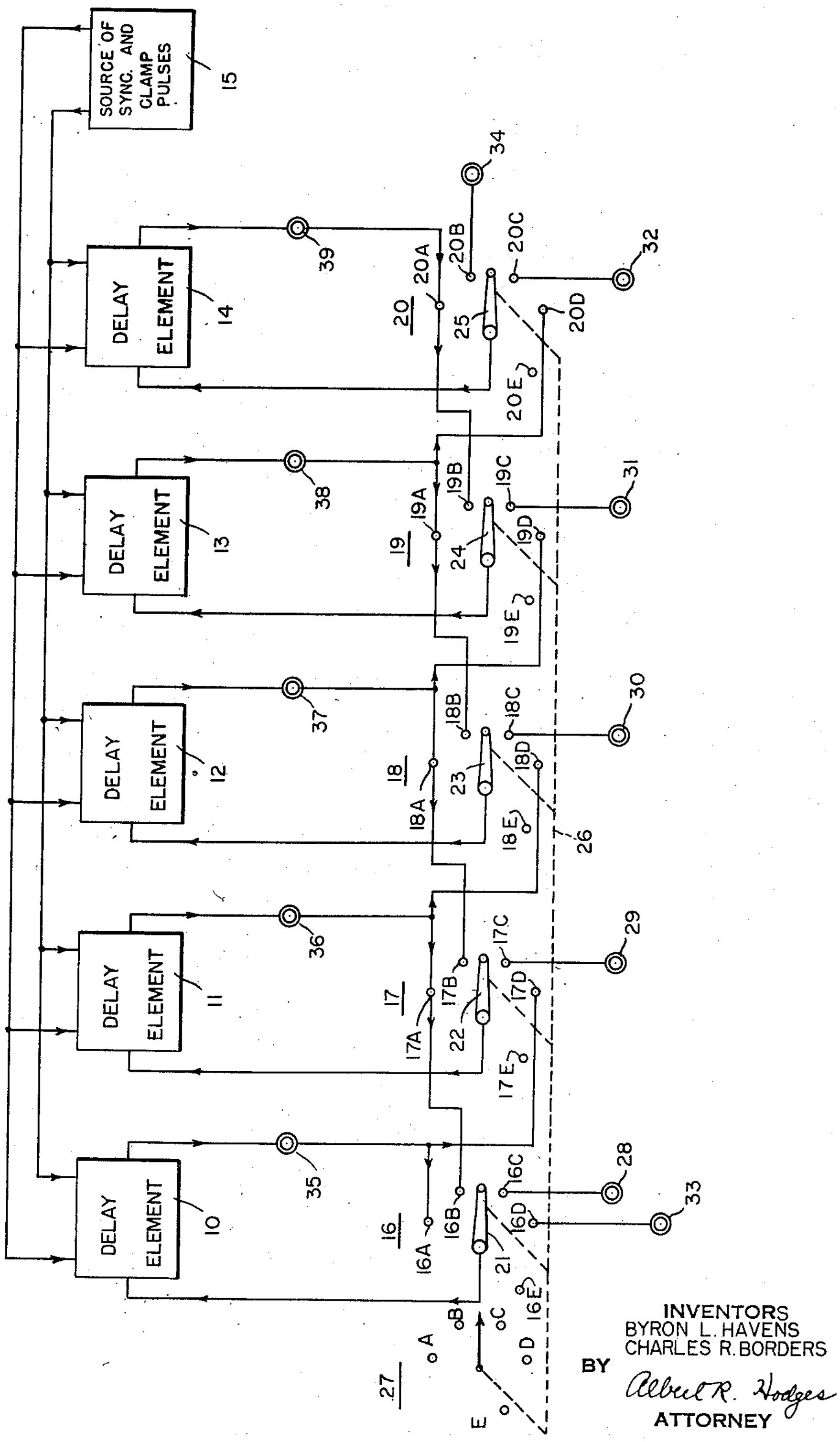

This invention relates to digital information registers, and more particularly to registers of the type which are capable of shifting as well as storing digital information. Such registers are particularly useful in electronic computers.

It is a principal object of the present invention to provide an improved register for digital information of superior flexibility and speed of operation.

Another object of the present invention is to provide a register which is capable not only of storing digital information but also of shifting such information to the left or to the right.

An additional object of the present invention is to provide a register which is capable of receiving and emitting information either in serial or in parallel form.

The register for digital information in accordance with the present invention comprises a plurality of delay elements having input and output terminals. Switching means are associated with each of these delay elements for selectively connecting its input terminal to its own output terminal, to the output terminal of another of the delay elements, or to an external source of digital information. For example, in a register in which the binary storage positions are arranged in a horizontal row and in which it is desired to provide a shift to the right or a shift to the left, the switching means would permit connecting the input terminal of each delay element to the output terminal of the delay element on its left, which may be called the next preceding element, or to the output terminal of the delay element on its right, sometimes referred to as the next succeeding element.

In accordance with another feature of the present invention, the switching means associated with each of the delay elements may also provide an open connection for the input terminal for the purpose of clearing the register.

In accordance with an additional feature of the present invention, the delay elements are of the electronic type. Although any suitable delay element may be utilized in the arrangements of the present invention, the delay elements are preferably of the type disclosed and claimed in Patent Re. 23,699, issued August 18, 1953, to Byron L. Havens, the original application having been filed July 30, 1951, and assigned to the same assignee as the present application. The delay elements in accordance with this copending application are utilized in the embodiment of the present invention which is shown and described by way of example in the present application. In any event, the delay introduced by each delay element substantially corresponds with the time interval of each digital bit.

In accordance with still another feature of the present invention, storage of digital information or data is achieved by utilizing the "regenerative capacitor" principle of operation.

Other objects and features of the present invention will be pointed out in the following description and claims and illustrated in the accompanying drawings, which disclose by way of example the principle of the invention and the best mode, which has been contemplated, of applying that principle.

Figure 2:
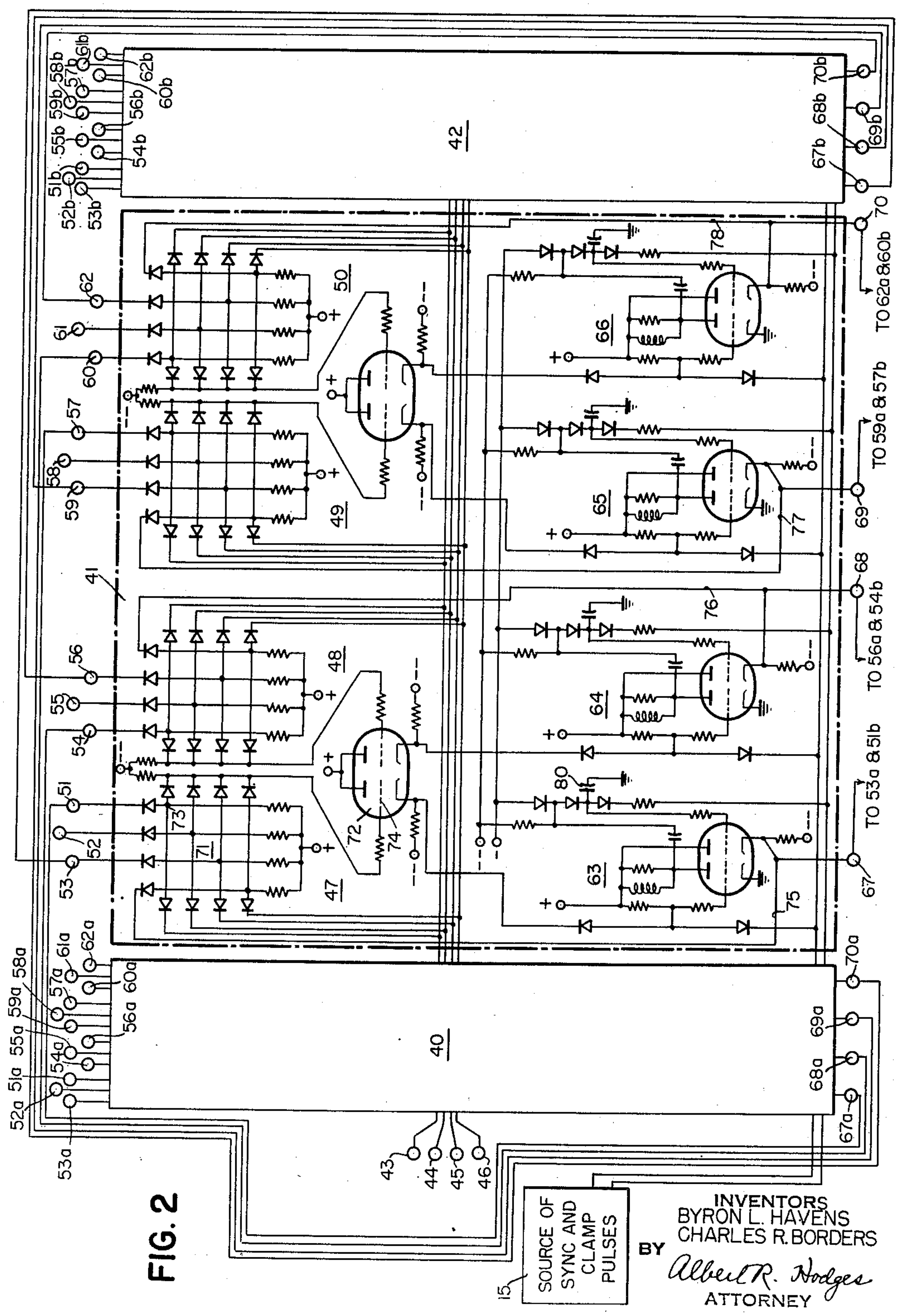

In the drawings, in which like components are designated by like reference numerals:

Fig. 1 is a schematic diagram, partly in block and symbolic form, of a portion of a universal register in accordance with the present invention; and Fig. 2 is a schematic circuit diagram, partly in block form, of a universal register in accordance with the present invention.

Referring to Fig. 1, which serves to illustrate the principle of operation of the present invention, there are shown a plurality of delay elements 10, 11, 12, 13 and 14, each adapted to handle a single binary bit of information. In order to simplify the explanation of the principle of operation, it is assumed in connection with this figure that five digits each represented by only a single binary bit are to be handled. It will be understood that, in general, a plurality, as for example four, binary bits are employed to represent each digit in most practical embodiments of the invention, and an arrangement for handling data in this form will be described later in connection with Fig. 2 of the drawings.

For the purpose of supplying synchronizing and clamping pulses to these delay elements, there is provided a source 15, the outputs of which are connected respectively to each of delay elements 10—14.

Associated with delay elements 10—14 are a plurality of single-pole, five-position switches, symbolically indicated at 16, 17, 18, 19 and 20. The movable arms 21, 22, 23, 24 and 25, respectively, of switches 16—20, are connected respectively to the input terminals of delay elements 10—14. Arms 21—25 are preferably ganged together for simultaneous operation, as indicated by broken line 26, and their settings are indicated as positions A, B, C, D and E in indicator unit 27. For simplicity of explanation, the various switch terminals will be designated by the reference numeral of the corresponding switch and the reference letter of the corresponding switch position.

Terminal 16A is connected to the output terminal of delay element 10 and to terminal 17D.

Terminal 16B is connected to terminal 17A, to the output terminal of delay element 11, and to terminal 18D. Terminals 16C, 17C, 18C, 19C and 20C are connected respectively to input jacks 28, 29, 30, 31 and 32. Terminal 16D is connected to jack 33.

Terminal 17B is connected to terminal 18A, to the output terminal of delay element 12, and to terminal 19D.

Terminal 18B is connected to terminal 19A, to the output terminal of delay element 13, and to terminal 20D.

Terminal 19B is connected to terminal 20A and to the output terminal of delay element 14. Terminal 20B is connected to jack 34. Jacks 35, 36, 37, 38 and 39 are provided respectively in the output leads from delay elements 10, 11, 12, 13 and 14. No connections are made to the E terminals of switches 16—20.

When switches 16—20 are set in their A positions, the register is arranged for storing. The output of each of delay elements 10—14 is connected through the corresponding switch to the input terminal of the same delay element, so that the signal information in each element repeatedly passes through that delay element and thus is effectively stored therein.

When switches 16—20 are in their B positions, the register is adapted for shifting to the left the digital data which is present in each of delay elements 10—14. Under this condition, the output terminal of each delay element is connected to the input terminal of the delay element on its left. In the case of delay element 10, which has no delay element at its immediate left, output jack 35 may, if desired, be connected to jack 34 and hence through switch 20 to the input terminal of delay element 14, thus effectively providing a loop or ring type of operation. A left shift of one binary position is made for each digital time interval during which the switches remain in their B positions.

If it is desired to write in to the register new digital information in parallel form, switches 16—20 are placed in their C positions for one digital time interval. Under this condition, jacks 28—32 are connected respectively to the input terminals of delay elements 10—14, and any information supplied to these jacks from an external source is thus introduced simultaneously, that is, in a single time interval, into the respective delay elements of the register. Digital information in serial form may be introduced, consecutively at a rate of one binary bit per time interval, at jack 34 or jack 33 with switches 16—20 in their B or D positions, respectively.

A shift to the right of the digital information in the register is achieved when switches 16—20 are placed in their D positions. Under these circumstances, the output terminal of each delay element is connected to the input terminal of the delay element at its right. In the case of delay element 14, on the right of which there is no delay element, output jack 39 may, if desired, be connected to jack 33 and hence through switch 16 to the input terminal of delay element 10, thus in effect providing a loop or ring arrangement. A right shift of one binary position is made for each digital time interval during which the switches remain in their D positions.

The digital information stored in the register may be read simultaneously, that is, in a single time interval, at jacks 35, 36, 37, 38 and 39; or read out in serial form, at a rate of one binary bit per time interval, at jack 35 or jack 39 with switches 16—20 set in their B or D positions, respectively.

By placing switches 16—20 in their E positions for one digital time interval, the register may be cleared of all digital information previously present.

It will be understood that the arrangement of Fig. 1 is symbolic for the purpose of simplifying the explanation of the principle of operation of the register, in that switches 16—20 are shown as ordinary single-pole, five-position mechanically operated switches. In most useful embodiments of the present invention, these switches will naturally be of an electrical type, so that they are inherently capable of extremely rapid operation. The substitution of any suitable type of electrical switches for switches 16—20 of Fig. 1, therefore, may be made without departing from the scope of the present invention, provided of course that the operating time of each switch is short compared with a digital time interval. Examples of suitable electrical switches are those utilizing diode-resistor matrices or employing electron discharge devices which are rendered conductive or non-conductive as required.

Fig. 2 shows a universal register, according to the present invention, which is adapted to handle numbers comprising three decimal digits each represented by four binary bits. Switching and delay units 40, 41 and 42, which are identical in internal arrangement, are provided for handling respectively the three decimal digits. For the purpose of controlling the switching operations within each of units 40, 41 and 42, terminals 43, 44, 45 and 46 are provided, and control potentials are applied to these terminals from an external source (not shown). One of terminals 43—46 is normally substantially at ground potential, the remaining terminals being at a negative potential with respect to ground. During the operation of clearing, however, all of terminals 43—46 are at a negative potential relative to ground. Source 15 supplies suitable synchronizing and clamping pulses to the delay elements within each of units 40, 41 and 42.

Switching and delay unit 41, which is shown in detail by way of example, is adapted to handle four binary bits representing one decimal digit, and comprises electrical switches 47, 48, 49 and 50. Groups of input terminals 51—53, 54—56, 57—59 and 60—62 are associated respectively with switches 47, 48, 49 and 50 as shown, as are delay elements 63, 64, 65 and 66, together with output terminals 67, 68, 69 and 70. Delay elements 63—66 are preferably of the type disclosed and claimed in the above-mentioned re-issued patent.

Switch 47, for example, comprises a diode-resistor matrix 71 and the left-hand portion of an electron discharge device 72, operating as a cathode follower. The first portion of matrix 71 functions as and "and" circuit, so that junction 73 for instance is raised in potential when both of input terminal 51 and control terminal 43 are raised in potential. This condition exists when a positive signal pulse, signifying a binary 1, is present at input terminal 51 and control terminal 43 is substantially at ground potential rather than at a potential substantially negative relative to ground. The remainder of matrix 71 serves as an "or" circuit, with the result that control electrode 74 of discharge device 72 is raised in potential whenever junction 73 or any of the other corresponding junctions is raised in potential. The resultant positive pulse is delayed one binary digit interval in delay element 63 and then appears at output terminal 67.

Input terminal 51 of unit 41 is connected to output terminal 67*a* of unit 40. Input terminals 52, 55, 58 and 61 are connected to any suitable source (not shown) of digital information, in parallel form, which it may be desired to write into the register of Fig. 2. Input terminal 53 is connected to output terminal 67*b* of unit 42. Input terminal 54 is connected to output terminal 68*a* of unit 40. Input terminal 56 is connected to output terminal 68*b* of unit 42. Input terminal 57 is connected to output terminal 69*a* of unit 40. Input terminal 59 is connected to output terminal 69*b* of unit 42. Input terminal 60 is connected to output terminal 70*a* of unit 40. Input terminal 62 is connected to output terminal 70*b* of unit 42.

Output terminal 67 of unit 41 is connected to input terminal 53*a* of unit 40 and to input terminal 51*b* of unit 42, as indicated. Output terminal 68 is connected to input terminals 56*a* and 54*b*, respectively of units 40 and 42. Output terminal 69 is connected to input terminals 59*a* and 57*b*, and output terminal 70 is connected to input terminals 62*a* and 60*b*. Output terminals 67, 68, 69 and 70 are also connected by leads 75, 76, 77 and 78, respectively, to switches 47, 48, 49 and 50.

In operation, let it first be assumed that control terminal 43 is substantially at ground potential, and that remaining terminals 44—46 are at a negative potential with respect to ground. This is the condition for shifting to the right. Digital information present in unit 40, by virtue of the connections between output terminals 67*a*—70*a* of unit 40 and input terminals 51, 54, 57 and 60 of unit 41, is transferred from unit 40 to unit 41. Since control terminal 43 is substantially at ground potential, positive pulses at any or all of input terminals 51, 54, 57 and 60 are permitted to pass through switches 47, 48, 49 and 50, respectively, and to reach delay elements 63—66. Such positive pulses then appear, in the next succeeding time interval, at the appropriate ones of output terminals 67, 68, 69 and 70. In a similar manner, digital data which had been present in unit 41 is passed on to and utilized in unit 42, by virtue of the connections between output terminals 67—70 of unit 41, and input terminals 51*b*, 54*b*, 57*b* and 60*b* of unit 42. If it is desired to secure a loop or ring type of operation, output terminals 67*b*—70*b* of unit 42 may be connected respectively to input terminals 51*a*, 54*a*, 57*a* and 60*a* of unit 40.

Now let it be assumed that control terminal 44 is substantially at ground potential, control terminals 43, 45 and 46 being at a negative potential relative to ground. Under this condition, digital data supplied from an external source to input terminals 52, 55, 58 and 61 of unit 41 is permitted to pass through switches 47, 48, 49 and 50, and thus to reach delay elements 63—66. The digital data thus introduced at input terminals 52, 55, 58 and 61 during a given time interval appears at output terminals 67—70 in the subsequent time interval. If the digital information is in decimal parallel form, it is also simultaneously supplied, in a single time interval, to input terminals **52*a*, 55*a*, 58*a* and 61*a* of unit 40 and to input terminals 52*b*, 55*b*, 58*b* and 61*b* of unit 42. If the data from the external source is in decimal serial form, it is supplied, consecutively at a rate of one decimal digit per time interval, to input terminals 51*a*, 54*a*, 57*a* and 60*a* of unit 40 or to input terminals 53*b*, 56*b*, 59*b* and 62*b* of unit 42**, the register being set to shift to the right or to the left as described above or below.

When control terminal 45 is substantially at ground potential, the other control terminals being maintained at a substantially negative potential relative to ground, the register is adapted for shifting digital information to the left. In this case, digital information present at output terminals **67*b*—70*b* of unit 42 is applied to input terminals 53, 56, 59 and 62 of unit 41 and, due to the fact that control terminal 45 is substantially grounded, this digital information passes through switches 47—50 to delay elements 63—66, and appears at output terminals 67—70 during the subsequent time interval. Under this condition of operation, the digital information previously present in unit 41 is supplied to input terminals 53*a*, 56*a*, 59*a* and 62*a* of unit 40, where it is utilized to produce an output at output terminals 67*a*—70*a* during the subsequent time interval. To secure a loop or ring type of operation, output terminals 67*a*—70*a* of unit 40 may be connected respectively to input terminals 53*b*, 56*b*, 59*b* and 62*b* of unit 42**.

The register may be made to operate for storing digital information by substantially grounding control terminal 46, the remaining control terminals 43—45 being maintained at a negative potential with respect to ground. Under this condition, the digital information present at output terminals 67—70 during a given time interval is supplied, by means of leads 75—78, to switches 47—50. Because control terminal 46 is substantially grounded, these switches are permitted to pass the digital information on to storage elements 63—66, so that the original digital information is reproduced at output terminals 67—70 during the next succeeding time interval.

During such operation as a storage device, each positive pulse is developed in delay element 63, for example, as a positive charge on capacitor 80. This positive charge in turn is utilized, in the manner just described, to introduce a positive pulse at the input of delay element 63, so that the system may be considered to be operating as a "regenerative capacitor," since the positive pulse thus introduced at the input of delay element 63 serves to recharge capacitor 80 and hence to replace the original positive charge on the capacitor, which otherwise would have disappeared at the end of the original time interval.

If all of control terminals 43—46 are maintained at a negative potential relative to ground, no digital data is permitted to pass through switches 47—50. In other words, each of delay elements 63—66 is effectively connected to an open circuit by switches 47—50. Hence, after the digital information previously in the register has passed through it, no new information is permitted to be placed in it. The register may thus be said to be cleared of all digital information.

Information is emitted from the register of Fig. 2 in parallel decimal form at output terminals **67*a*—70*a* of unit 40, terminals 67—70 of unit 41, and terminals 67*b*—70*b* of unit 42. By setting the register to shift left, information in serial decimal form may be taken from terminals 67*a*—70*a* of unit 40. If the register is set to shift right, information in the same form but in reverse order becomes available at terminals 67*b*—70*b*** of unit 42.

It will be seen from the foregoing description that the register in accordance with the present invention is truly universal. Information can be read in or out in serial or in parallel form; shifted to other positions, as for example to the left or to the right, or stored; or converted from serial to parallel form, or vice versa.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A register for digital information comprising the combination of: a plurality of delay elements each having input and output terminals; and switching means associated with each of said delay elements for selectively connecting the input terminal of each of said delay elements to its own output terminal, to the output terminal of another one of said delay elements, or to an external source of digital information.

2. A register for digital information comprising the combination of: a plurality of delay elements each having input and output terminals; and switching means associated with each of said delay elements for selectively connecting the input terminal of each of said delay elements to its own output terminal, to the output terminal of another one of said delay elements, to an external source of digital information, or to an open circuit.

3. A register for digital information comprising the combination of: a plurality of electronic delay elements each having input and output terminals; and switching means associated with each of said delay elements for selectively connecting the input terminal of each of said delay elements to its own output terminal, to the output terminal of another one of said delay elements, or to an external source of digital information.

4. A register for digital information comprising the combination of: a plurality of delay elements each having input and output terminals; a source of clamping pulses and synchronizing pulses operatively associated with said delay elements; and switching means associated with each of said delay elements for selectively connecting the input terminal of each of said delay elements to its own output terminal, to the output terminal of another one of said delay elements, or to an external source of digital information.

5. A register for digital information comprising the combination of: a plurality of delay elements each having input and output terminals; and switching means associated with each of said delay elements for selectively connecting the input terminal of each of said delay elements to its own output terminal, to the output terminal of the next preceding one of said delay elements, to the output terminal of the next succeeding one of said delay elements, or to an external source of digital information.

6. A register for digital information comprising the combination of: a plurality of delay elements each having input and output terminals; and switching means associated with each of said delay elements for selectively connecting the input terminal of each of said delay elements to its own output terminal, to the output terminal of the next preceding one of said delay elements, to the output terminal of the next succeeding one of said delay elements, to an external source of digital information, or to an open circuit.

7. A register for digital information comprising the combination of: a plurality of electronic delay elements each having input and output terminals; and switching means associated with each of said delay elements for selectively connecting the input terminal of each of said delay elements to its own output terminal, to the output terminal of the next preceding one of said delay elements, to the output terminal of the next succeeding one of said delay elements, or to an external source of digital information.

8. A register for digital information comprising the combination of: a plurality of delay elements each having input and output terminals; and switching means associated with each of said delay elements for selectively connecting the input terminal of each of said delay elements to its own output terminal, to the output terminal of the next preceding one of said delay elements, to the output terminal of the next succeeding one of said delay elements, or to an external source of digital information, said switching means comprising a diode-resistor matrix.

9. A register for digital information comprising the combination of: a plurality of delay elements each having input and output terminals; a source of clamping pulses and synchronizing pulses operatively associated with said delay elements; and switching means associated with each of said delay elements for selectively connecting the input terminal of each of said delay elements to its own output terminal, to the output terminal of the next preceding one of said delay elements, to the output terminal of the next succeeding one of said delay elements, or to an external source of digital information.

10. A register for digital information consisting of a plurality of decimal digits each represented by a group of binary bits, comprising the combination of: a group of delay elements corresponding to each of said decimal digits, each said group including delay elements corresponding with the binary bits of the respective one of said decimal digits; and switching means associated with each of said delay elements for selectively connecting the input terminal of each of said delay elements to its own output terminal, to the output terminal of a delay element occupying a corresponding position in another of said groups of delay elements, or to an external source of digital information.

11. A register for digital information consisting of a plurality of decimal digits each represented by a group of binary bits, comprising the combination of: a group of delay elements corresponding to each of said decimal digits, each said group including delay elements corresponding with the binary bits of the respective one of said decimal digits; switching means associated with each of said delay elements for selectively connecting the input terminal of each of said delay elements to its own output terminal, to the output terminal of a delay element occupying a corresponding position in another of said groups of delay elements, or to an external source of digital information; and means for simultaneously operating said switching means for selectively writing in, shifting or storing said digital information.

12. A register for digital information consisting of a plurality of decimal digits each represented by a group of binary bits, comprising the combination of: a group of delay elements corresponding to each of said decimal digits, each said group including delay elements corresponding with the binary bits of the respective one of said decimal digits; and switching means associated with each of said delay elements for selectively connecting the input terminal of each of said delay elements to its own output terminal, to the output terminal of a delay element occupying a corresponding position in another of said groups of delay elements, to an external source of digital information, or to an open circuit.

13. A register for digital information consisting of a plurality of decimal digits each represented by a group of binary bits, comprising the combination of: a group of delay elements corresponding to each of said decimal digits, each said group including delay elements corresponding with the binary bits of the respective one of said decimal digits; switching means associated with each of said delay elements for selectively connecting the input terminal of each of said delay elements to its own output terminal, to the output terminal of a delay element occupying a corresponding position in another of said groups of delay elements, to an external source of digital information, or to an open circuit; and means for simultaneously operating said switching means for selectively writing in, shifting, storing or clearing said digital information.

14. A digital data storage system comprising: a pulse delay circuit having input and output terminals and including means between said input and output terminals for producing a delay of a given time interval in the transmission of a pulse applied to said input terminals, said means comprising plural rectifier elements and capacitive means associated with said elements; and means for applying the delayed output pulse at said output terminals to said input terminals whereby the presence of said repeatedly delayed pulse is indicative of the digit stored therein.

15. A digital data storage system comprising: a pulse delay circuit having input and output terminals and including means between said input and output terminals for producing a delay of a given time interval in the transmission of a pulse applied to said input terminals, said means comprising a capacitive element and plural rectifier elements adapted for successively charging and discharging said capacitive element following the application of a pulse to said input terminals; and means for applying the delayed output pulse at said output terminals to said input terminals whereby the presence of said repeatedly delayed pulse is indicative of the digit stored therein.

16. A digital data storage system comprising: a pulse delay circuit having input and output terminals and including means between said input and output terminals for producing a delay of a given time interval in the transmission of a pulse applied to said input terminals, said means comprising a capacitive element and plural rectifier elements adapted for successively charging and discharging said capacitive element following the application of a pulse to said input terminals, the charge of said capacitive element during a given time interval being utilized to recharge said capacitive element during a succeeding time interval; and means for applying the delayed output pulse at said output terminals to said input terminals whereby the presence of said repeatedly delayed pulse is indicative of the digit stored therein.

17. A digital data storage system comprising: a pulse delay circuit having input and output terminals and including means between said input and output terminals for producing a delay of a given time interval in the transmission of a pulse applied to said input terminals, said means comprising a series network comprising a plurality of rectifier elements connected between a first source of negative potential and a source of normally positive potential, a series network comprising a plurality of impedance elements connected between said input terminal and a second source of negative potential with the junction of a pair of said impedance elements connected to the junction of a first pair of said rectifier elements, and a capacitive element connected to the junction of a second pair of said rectifier elements; and means for applying the delayed output pulse at said output terminals to said input terminals whereby the presence of said repeatedly delayed pulse is indicative of the digit stored therein.

18. A register for plural orders of information comprising the combination of: a delay means for each said order, each said delay means having input and output terminals and being adapted for producing a delay of a given time interval in the transmission of an information-representing pulse between its input and output terminals; and switching means for selectively connecting the output terminal of one of said delay means to its own input terminal or to a pulse-receiving device, and the output terminal of each remaining said delay means to its own input terminal or to the input terminal of another one of said delay means to establish a chain of said delay means, whereby an information-representing pulse may be stored in each said delay means or shifted to the delay means of a different order.

19. A register for plural orders of information comprising the combination of: a delay means for each said order, each said delay means having input and output terminals and including an electron valve circuit for producing a delay of a given time interval in the transmission of an information-representing pulse between its input and output terminals; and circuit means connecting the output terminal of each said delay means to its own input terminal whereby a pulse may be stored in each said delay means, said circuit means including switching means for selectively interrupting the output to input connection associated with each said delay means and connecting the output terminal of all except the delay means corresponding to an end order to the input terminal of another one of said delay means to establish a chain of said delay means, whereby pulses stored in any of said delay means except said end-order delay means may be shifted to corresponding adjacent delay means.

20. A register for plural orders of information comprising the combination of: a series of delay means having one delay means for each said order, each said delay means having an input terminal and an output terminal and being adapted for producing a delay of a given time interval in the transmission of an information-representing pulse between its input and output terminals; and circuit means connecting the output terminal of each of said delay means to its own input terminal whereby a pulse may be stored in each said delay means, said circuit means including switching means for selectively interrupting the output to input connection associated with each said delay means and connecting the output terminal of all except the first of said series of delay means to the input terminal of the next preceding one of said delay means, or connecting the output terminal of all except the last of said series of delay means to the input terminal of the next succeeding one of said delay means, whereby information-representing pulses stored in said series of delay means may be shifted an order to the left or an order to the right.

21. In combination: a pulse delay circuit having input and output terminals and including an electron valve circuit for producing a delay of a given time interval in the transmission of a pulse between said input and output terminals, and switching means having store and transfer states associated with said delay circuit for selectively supplying a delayed pulse at said output terminals to said input terminals or to an external device, whereby said delayed pulse may be either stored or transferred to said external device.

22. An information storage system comprising the combination of: pulse delay means having an input terminal and an output terminal and providing a delay of a given time interval in the transmission of a pulse therebetween including means transmitting and synchronizing said pulse and substantially maintaining the shape, amplitude and polarity thereof; and a direct conductive connection for applying a pulse appearing at said output terminal to said input terminal to repeatedly circulate said pulse through said delay means to store information therein.

References Cited in the file of this patent

UNITED STATES PATENTS

| | | |
|---|---|---|
| 2,212,173 | Wheeler et al. | Aug. 20, 1940 |
| 2,482,974 | Gordon | Sept. 27, 1949 |
| 2,522,957 | Miller | Sept. 19, 1950 |
| 2,534,287 | Marsh | Dec. 19, 1950 |
| 2,554,994 | Lester | May 29, 1951 |
| 2,559,499 | Gillette et al. | July 3, 1951 |
| 2,601,089 | Burkhart | June 17, 1952 |
| 2,601,289 | Hollobaugh | June 24, 1952 |
| 2,617,879 | Sziklai | Nov. 11, 1952 |
| 2,621,292 | White | Dec. 9, 1952 |
| 2,629,827 | Eckert et al. | Feb. 24, 1953 |
| 2,638,542 | Fleming | May 12, 1953 |
| 2,644,893 | Gehman | July 7, 1953 |
| 2,679,040 | Gloess | May 18, 1954 |